(12) United States Patent
Keh et al.

(10) Patent No.: US 10,920,957 B2
(45) Date of Patent: Feb. 16, 2021

(54) LIGHT SOURCE MODULE INCLUDING TRANSPARENT MEMBER WITH META-SURFACE AND ELECTRONIC DEVICE COMPRISING THE SAME

(71) Applicant: SAMSUNG ELECTRONICS CO., LTD., Suwon-si (KR)

(72) Inventors: Yongchan Keh, Suwon-si (KR); Byeonghoon Park, Suwon-si (KR); Youngkwon Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/367,423

(22) Filed: Mar. 28, 2019

(65) Prior Publication Data

US 2019/0309925 A1 Oct. 10, 2019

(30) Foreign Application Priority Data

Apr. 4, 2018 (KR) .................. 10-2018-0038991

(51) Int. Cl.
*F21V 3/04* (2018.01)
*F21V 5/00* (2018.01)
(Continued)

(52) U.S. Cl.
CPC .............. *F21V 3/04* (2013.01); *F21V 5/00* (2013.01); *G02B 1/002* (2013.01); *G02B 5/1809* (2013.01); *F21Y 2115/30* (2016.08)

(58) Field of Classification Search
CPC .. F21V 3/04; F21V 5/00; G02B 1/002; G02B 5/1809; F21Y 2115/30
See application file for complete search history.

(56) References Cited

U.S. PATENT DOCUMENTS 9,721,952 B2 * 8/2017 Kim .................. H01L 29/78
10,402,993 B2 * 9/2019 Han .................. G02B 27/106
(Continued)

FOREIGN PATENT DOCUMENTS

EP 3 226 042 10/2017
EP 3 480 555 5/2019
(Continued)

OTHER PUBLICATIONS

International Search Report and Written Opinion dated Jul. 4, 2019 in counterpart International Patent Application No. PCT/KR2019/003575.
(Continued)

*Primary Examiner* — Tracie Y Green
(74) *Attorney, Agent, or Firm* — Nixon & Vanderhye P.C.

(57) ABSTRACT

In an embodiment, a light source module may include a substrate, a light emitter comprising a light source disposed on one surface of the substrate and including an array of light emitting elements configured to emit light, a support disposed on the one surface of the substrate and accommodating at least a portion of the light emitter, and a transparent member comprising transparent material disposed over the support. The transparent member may include a pattern layer disposed on a first surface of the transparent member and configured to change a pattern of the light output from the light emitting elements, and a first meta-surface disposed on a second surface of the transparent member and including a plurality of first unit structures configured to change an angle of the light that passed through the pattern layer.

20 Claims, 7 Drawing Sheets

(51) Int. Cl.
*G02B 5/18* (2006.01)
*G02B 1/00* (2006.01)
F21Y 115/30 (2016.01)

(56) References Cited

U.S. PATENT DOCUMENTS

| | | | |
|---|---|---|---|
| 10,444,355 B2* | 10/2019 | Pala | G02F 1/21 |
| 2011/0180779 A1* | 7/2011 | Han | H01L 33/06 |
| | | | 257/13 |
| 2012/0087007 A1 | 4/2012 | Suganuma | |
| 2013/0038881 A1 | 2/2013 | Pesach et al. | |
| 2015/0003106 A1 | 1/2015 | Thompson et al. | |
| 2015/0085384 A1 | 3/2015 | Choi et al. | |
| 2016/0091171 A1* | 3/2016 | Okada | F21V 29/70 |
| | | | 372/44.01 |
| 2016/0127714 A1 | 5/2016 | Hazeghi et al. | |
| 2016/0164258 A1 | 6/2016 | Weichmann et al. | |
| 2017/0287151 A1 | 10/2017 | Han et al. | |
| 2019/0137856 A1 | 5/2019 | Na et al. | |

FOREIGN PATENT DOCUMENTS

| | | |
|---|---|---|
| KR | 10-2017-0112915 | 10/2017 |
| WO | 2012-120738 | 9/2012 |

OTHER PUBLICATIONS

Extended Search Report dated Aug. 19, 2019 in counterpart European Patent Application No. 19166983.7.

\* cited by examiner

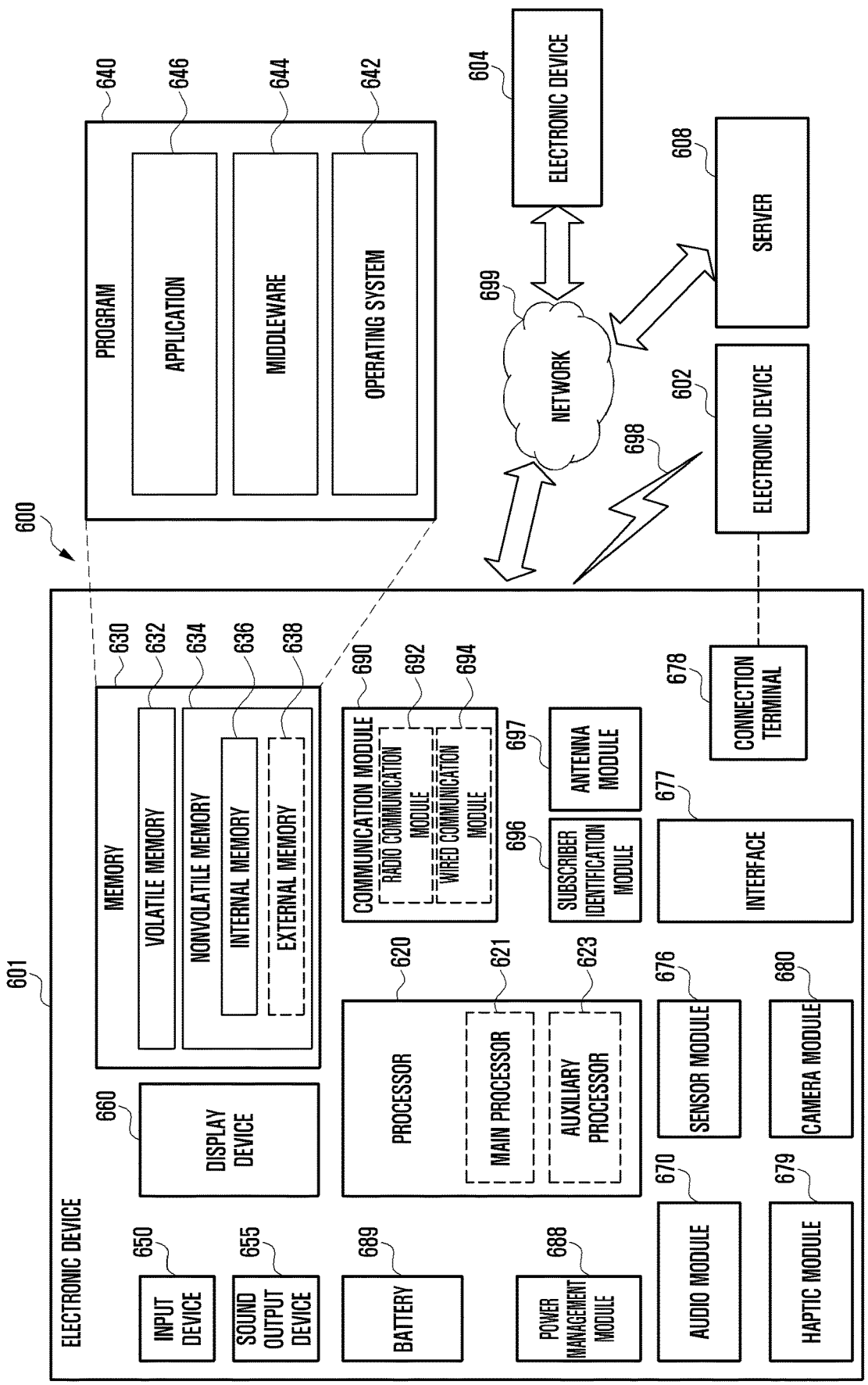

LIGHT SOURCE MODULE INCLUDING TRANSPARENT MEMBER WITH META-SURFACE AND ELECTRONIC DEVICE COMPRISING THE SAME

CROSS-REFERENCE TO RELATED APPLICATION

This application is based on and claims priority under 35 U.S.C. § 119 to Korean patent application number 10-2018-0038991, filed on Apr. 4, 2018, in the Korean Intellectual Property Office, the disclosure of which is incorporated by reference herein in its entirety.

TECHNICAL FIELD

The disclosure relates to a light source module including a transparent member having a meta-surface formed thereon and to an electronic device comprising the same.

BACKGROUND

Description of Related Art

Today, a great variety of electronic devices including a smart phone, a tablet personal computer (PC), a laptop PC, and a wearable device such as a wrist watch or a head-mounted display (HMD) have been popularized. Most of such electronic devices provide a camera function to capture and record an image of a subject. In addition, some of recent electronic devices have two or more types of cameras to enhance user convenience.

Using these various types of cameras, the electronic device can provide a precise three-dimensional sensing function with respect to a certain object. For example, it is possible to precisely sense the shape, position, or motion of the object.

For more precise three-dimensional sensing, a structured light may be used. The structured light can be produced by adding a unique characteristic (e.g., pattern) to light starting from a light source and used for object recognition.

To produce the structured light, a light source module such as a diffractive optical element (DOE) may be used in general. However, because recent electronic devices are becoming smaller and lighter, there arises a problem of difficulty in mounting a bulky DOE within such electronic devices.

SUMMARY

Various embodiments of the disclosure provide a light source module adapted for a structured light and applicable to a small electronic device.

Various embodiments of the disclosure provide a light source module having increased light efficiency and an electronic device including the light source module.

According to various example embodiments of the disclosure, a light source module may comprise a substrate; a light emitter comprising a light source disposed on one surface of the substrate and including an array of light emitting elements configured to emit light; a support disposed on the one surface of the substrate and accommodating at least a portion of the light emitter; and a transparent member comprising transparent material disposed over the support. The transparent member may include a pattern layer disposed on a first surface of the transparent member and configured to change a pattern of the light output from the light emitting elements, and a first meta-surface disposed on a second surface of the transparent member and including a plurality of first unit structures configured to change an angle of the light that passed through the pattern layer.

According to various example embodiments of the disclosure, a light source module may comprise a substrate; a light emitter comprising a light source disposed on one surface of the substrate and including an array of light emitting elements configured to emit light; a support disposed on the one surface of the substrate and accommodating at least a portion of the light emitter, wherein the light emitter is configured to output the light toward at least a portion of the support; and a transparent member comprising transparent material disposed over the support. The transparent member may include a pattern layer disposed on a first surface of the transparent member and configured to change a pattern of the light output from the light emitting elements, and a first meta-surface disposed on a second surface of the transparent member and including a plurality of first unit structures configured to change an angle of the light that passed through the pattern layer.

According to various example embodiments of the disclosure, a light source module may comprise a substrate; a first light emitter comprising a first light source disposed in a first region on one surface of the substrate and including an array of first light emitting elements configured to emit light of a first infrared wavelength band; a second light emitter comprising a second light source disposed in a second region on the one surface of the substrate and including an array of second light emitting elements configured to emit light of a second infrared wavelength band; a support disposed on the one surface of the substrate and accommodating at least a portion of the first and second light emitters; and a transparent member comprising transparent material disposed over the support. The transparent member may include a pattern layer disposed on a first surface of the transparent member and configured to change a pattern of the light output from the first light emitting elements, and a first meta-surface disposed on a second surface of the transparent member and including a plurality of first unit structures configured to change an angle of the light that passed through the pattern layer.

According to various embodiments of the disclosure, the light source module can be applied to a small-sized electronic device and realizes more accurate three-dimensional sensing using a very small-sized structure.

According to various embodiments of the disclosure, the light source module does not need to include a masking pattern layer, thus reducing light loss occurring when light is transmitted or reflected.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 6 is a block diagram illustrating an electronic device in a network environment according to various embodiments.

DETAILED DESCRIPTION

Various example embodiments of the disclosure will be described in greater detail with reference to the accompanying drawings.

Figure 1A:
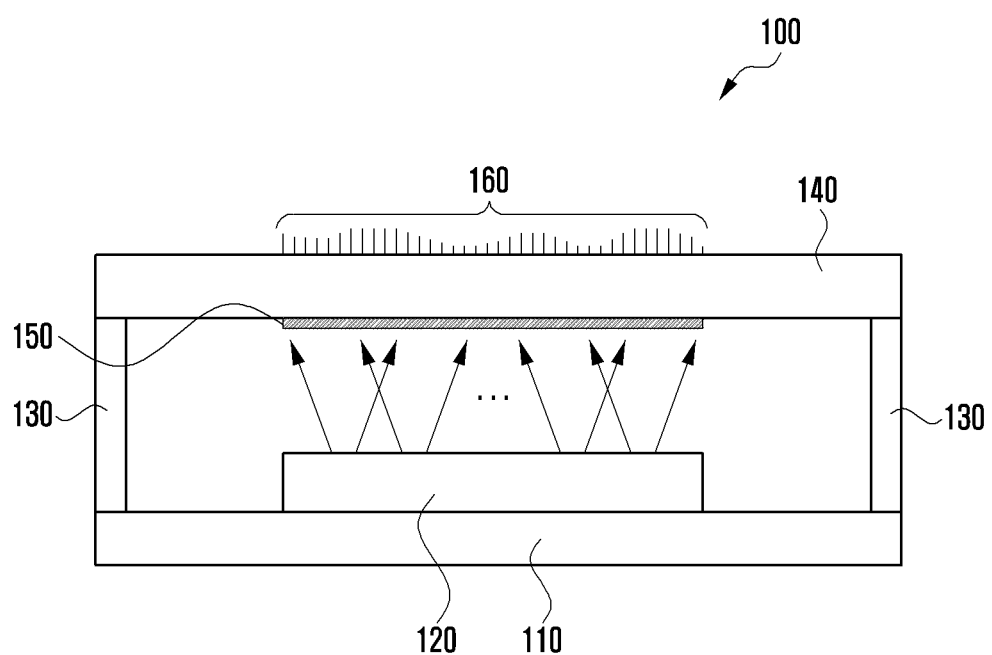
FIGS. 1A and 1B are diagrams illustrating an example light source module according to various embodiments.
Figure 1B:
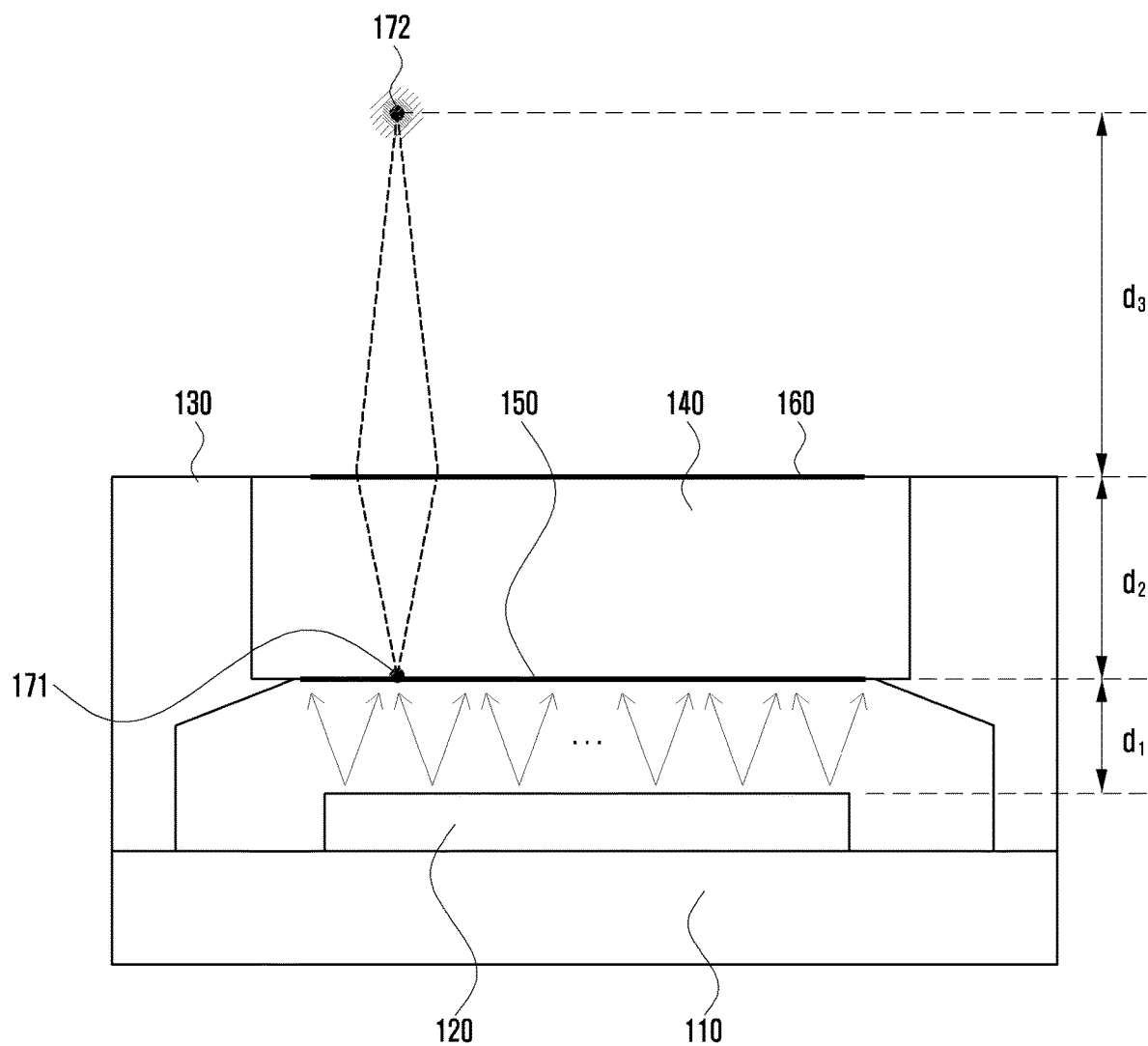

FIGS. 1A and 1B are diagrams illustrating an example light source module 100 according to various embodiments.

According to various embodiments, the light source module 100 may include a substrate 110, a light emitter (e.g., including light source) 120, a support member 130, a transparent member 140, and a pattern layer 150. In some embodiments, the light source module 100 may omit at least one of the above components or further include any other component.

According to various embodiments, the substrate 110 may be electrically connected to the light emitter 120 and thereby transmit a control signal. The substrate 110 may be, for example, and without limitation, a printed circuit board (PCB), a flexible printed circuit board (FPCB), a rigid flexible printed circuit board (RFPCB), or the like. According to an embodiment, the substrate 110 (e.g., a first substrate) may be laminated with another substrate (e.g., a second substrate) to form a multilayer circuit substrate. For example, the second substrate may be stacked under and electrically connected to the first substrate and thereby transmit a control signal to the light source module 100 mounted on the first substrate. In another embodiment, a third substrate may be further used. In this example, the second substrate may transmit a control signal to the third substrate for controlling electronic components, e.g., a camera module, other than the light source module.

According to various embodiments, the light emitter 120 may include an array of light emitting elements capable of emitting light and be disposed on one surface of the substrate 110. For example, the light emitter 120 may output light by selecting at least one of the light emitting elements. According to an embodiment, the light emitting element may include, without limitation, a laser light source, or the like. The laser light source may be, for example, and without limitation, an edge emitting laser, a vertical-cavity surface emitting laser (VCSEL), a distributed feedback laser, or the like.

According to an embodiment, the light emitter 120 may be formed of the VCSEL and thereby output collimated light toward the pattern layer 150. The light emitted by the light emitting elements may form, on the pattern layer 150, a planar light source having substantially uniform brightness and intensity. For example, referring to FIG. 1B, the light emitter 120 and the pattern layer 150 may be spaced apart from each other by a predetermined distance (d1) so that the light output from the light emitting elements can form a planar light source on the pattern layer. In an embodiment, the light emitter 120 and the pattern layer 150 may be spaced apart from each other by about 0.2 to 0.3 mm.

According to various embodiments, the support member 130 may be disposed on one surface of the substrate 110 and separated from the light emitter 120. The support member 130 supports the transparent member 140 so that the transparent member 140 and the light emitter 120 are spaced apart from each other by a predetermined distance (d1). The support member 130 may accommodate at least a portion of the light emitter 120. According to an embodiment, at least a portion of the support member 130 may operate as a tilted mirror that reflects the light, output from the light emitter 120, toward the transparent member 140. For example, at least a portion of the support member 130 may be formed to have a slope of a specified angle with respect to the light emitter 120. A related description will be described in greater detail below.

According to various embodiments, the transparent member 140 may be disposed over the support member 130. According to an embodiment, the transparent member 140 may form, at least in part, one surface of the light source module 100. For example, the transparent member 140 may be formed as a housing that protects electronic components (e.g., the light emitter 120) inside the light source module 100 by dispersing or absorbing a pressure applied from the inside or outside. According to an embodiment, the transparent member 140 may be formed of a material having a low refractive index and causing no or little light loss when an incident light passes through the transparent member 140 (e.g., a transparent material). For example, the transparent member 140 may be formed of, for example, and without limitation, glass (e.g., $SiO_2$), polymer (e.g. PDMS, SU8, PC, PS, or PMMA), or the like that allows the light output from the light emitter 120 to pass through the transparent member 140 to the outside.

According to various embodiments, the thickness of the transparent member 140 may be determined according to a focal length (f) based on the characteristics of a first metasurface 160. The thickness of the transparent member 140 may correspond to an image-side focal length (d2). Referring to FIG. 1B, it is shown that the light passing through the pattern layer 150 forms an image-side focal point 171. The light traveling from the image-side focal point 171 is refracted while passing through a first medium (e.g., the transparent member 140), passes through the first metasurface 160, and then forms an object-side focal point 172 when passing through a second medium (e.g., air). In this example, the degree of refraction may be controlled through phase adjustment by a meta-structure (e.g., the first metasurface 160). When the thickness of the transparent member 140 corresponds to the image-side focal length (d2), a distance from the transparent member 140 to the object-side focal point 172 corresponds to an object-side focal length (d3). The focal length (f), the image-side focal length (d2), and the object-side focal length (d3) may have the following relationship.

$$\frac{1}{f} = \frac{1}{d2} + \frac{1}{d3}$$

According to an embodiment, the image-side focal length (d2) of the light source module may be determined as about 0.9 to 1.5 mm. In other words, the thickness of the transparent member 140 may be about 0.9 to 1.5 mm, which overcomes spatial limitations of the electronic device due to the trend of becoming smaller and lighter. If the image-side focal length (d2) of the light source module is 0.9 to 1.5 mm, the object-side focal length (d3) may be determined as about 700 to 1000 mm. Also, depending on the object-side focal length (d3), the image-side focal length (d2) may be determined. In addition, the image-side focal length (d2) and the object-side focal length (d3) may be variously changed according to the focal length (f) based on the characteristics of the first meta-surface 160.

According to various embodiments, the pattern layer 150 may be formed on or attached to a first surface of the transparent member 140 and change the pattern of light output from the light emitting elements. The pattern layer 150 may transmit a part of light output from the light emitting elements and also absorb or reflect the other part. For example, the pattern layer 150 may include a transparent region and an opaque region. A part of the light output from the light emitting elements fails to pass through the opaque region and is thus darkly projected, and the other part pass through the transparent region and is thus brightly projected.

According to an embodiment, the pattern layer 150 may be formed like a mask of a metallic material. For example, a metal sheet having a hole at least in part may form the hole as a transparent region, and the light passing the pattern layer 150 through the hole may be output in a designated pattern.

According to an example embodiment, the pattern layer 150 (e.g., a pattern layer 350 in FIG. 3 or a pattern layer 450 in FIG. 4) may include a second meta-surface that includes second unit structures. For example, a plurality of second unit structures may be disposed in various two-dimensional arrangements on the other surface of the transparent member 140. According to an embodiment, the plurality of second unit structures may be disposed in a designated arrangement to output the light output from the light emitting elements in a designated pattern. The light output from the light emitting elements may be changed in pattern while passing through the second meta-surface. For example, the second meta-surface and the second unit structure may be understood as structures similar to the first meta-surface 160 and a first unit structure (161 in FIG. 2), respectively. For example, the plurality of second unit structures may be different from each other in height, diameter, and interval. In addition, the second unit structures may be formed to have dimensional elements having a length smaller than a wavelength band of the light output from the light emitting elements. According to various embodiments, the first meta-surface 160 may be formed on a second surface of the transparent member 140 and include a plurality of first unit structures capable of changing the angle of the light whose pattern is changed through the pattern layer 150. According to an example embodiment, the locations of the pattern layer 150 and the first meta-surface 160 may be selectively interchanged.

Figure 2:
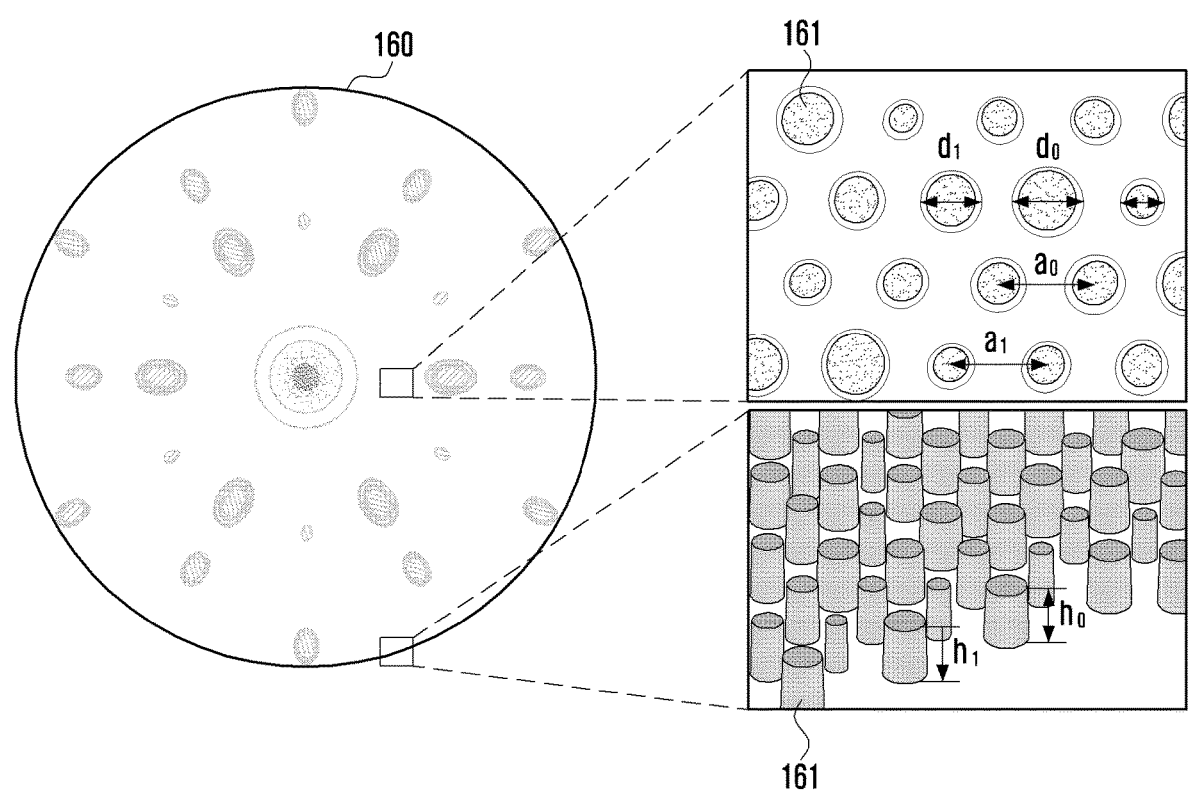
FIG. 2 is a diagram illustrating an example first meta-surface according to an embodiment.

FIG. 2 is a diagram illustrating an example first meta-surface 160 according to an embodiment.

According to various embodiments, a plurality of first unit structures 161 may be disposed in various two-dimensional arrangements on one surface of the transparent member 140. According to an embodiment, the plurality of first unit structures 161 may be disposed in a designated arrangement to refract the incident light in a desired direction.

According to various embodiments, the plurality of first unit structures 161 may be formed, for example, and without limitation, in cylindrical shapes having different heights (e.g., $h_0$ or $h_1$) and different diameters (e.g., $d_0$ or $d_1$). The shape of the first unit structures 161 is not limited to a cylindrical shape. The first unit structures 161 may be formed in various other shapes such as, for example, and without limitation, a polygonal shape, a cross shape, a star shape, an asymmetric shape, or the like. According to an embodiment, the first unit structures 161 may be disposed at different intervals (e.g., $a_0$ or $a_1$).

According to various embodiments, the first unit structure 161 may temporarily capture a part of the incident light therein, based on a difference in refractive index between the first unit structure 161 and the transparent member 140.

According to various embodiments, the first unit structure 161 may be formed to have a dimensional element having a length smaller than a wavelength band of the light output from the light emitting elements. The dimensional element may refer to a length element, such as height or diameter, of a three-dimensional shape of the first unit structure. In an example embodiment, the dimensional element may refer to an interval between the first unit structures. For example, because infrared rays or visible rays have a wavelength band of several hundred nanometers, the dimensional element of the first unit structure 161 for transmitting and receiving infrared rays or visible rays may be several hundred nanometers or less. For example, in order to transmit and receive infrared rays, the first unit structure 161 may have a height of about 600 to 700 nm and a diameter of about 120 to 150 nm. In another example, the first unit structures 161 may be spaced apart from each other at intervals of about 350 to 400 nm.

According to various embodiments, the first unit structure 161 may be formed of a material having a higher refractive index than that of the transparent member 140. For example, the first unit structure 161 may be formed of, for example, and without limitation, at least one of single crystal silicon, polycrystalline silicon (poly Si), amorphous Si, $Si_3N_4$, $TiO_2$, AlSb, AlAs, AlGaAs, AlGaInP, BP, $ZnGeP_2$, c-Si, a-Si, p-Si, GaP, GaAs, SiC, $TiO_2$, SiN, GaN, or the like. According to an embodiment, a surface of the first unit structure 161 may be planarized by forming a passivation film thereon. For example, the passivation film having a thickness of about 1 to 1.5 um may be formed on the surface of the first unit structure 161.

According to various embodiments, one surface of the transparent member 140 including the plurality of first unit structures 161 may form the first meta-surface 160. The first meta-surface 160 may operate as a variety of optical elements. For example, the first meta-surface 160 may act as, without limitation, a convex lens, a concave lens, a prism, an optical deflector, or the like.

Figure 3:
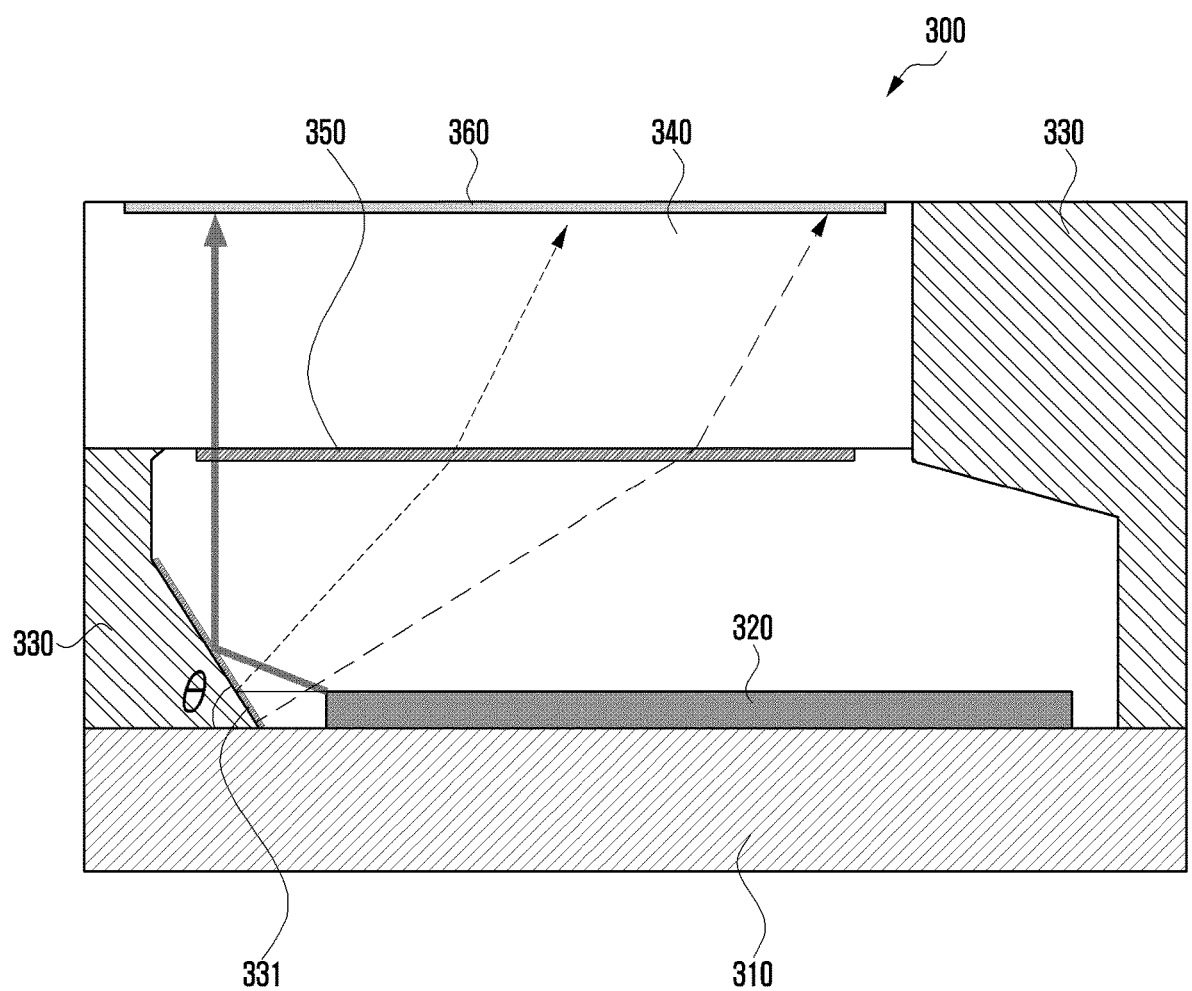
FIG. 3 is a diagram illustrating an example light source module according to an embodiment.

FIG. 3 is a diagram illustrating an example light source module 300 according to an embodiment. The light source module 300 shown in FIG. 3 may correspond to the light source module 100 shown in FIG. 1 or a part thereof.

According to various embodiments, the light source module 300 (e.g., the light source module 100 of FIG. 1) may include a substrate 310 (e.g., the substrate 110 of FIG. 1), a light emitter (e.g., including a light source) 320 (e.g., the light emitter 120 of FIG. 1), a support member (e.g., a support) 330 (e.g., the support member 130 of FIG. 1), a transparent member (e.g., including a transparent material) 340 (e.g., the transparent member 140 of FIG. 1), a pattern layer 350 (e.g., the pattern layer 150 of FIG. 1), and a first meta-surface 360 (e.g., the first meta-surface 160 of FIG. 1). In some embodiments, the light source module 300 may omit at least one of the above components or further include any other component.

According to various embodiments, the light emitter 320 may include various light sources, such as, for example, and without limitation, at least one of an edge emitting laser, a distributed feedback laser, or the like, which may receive a control signal from the substrate 310 and output light toward the support member 330 disposed near the side of the light emitter 320.

According to various embodiments, at least a portion of the support member 330 may operate as a tilted mirror that reflects the light, output from the light emitter 320, toward the pattern layer 350. The support member 330 may include a metallic material capable of reflecting light, such as, for example, and without limitation, at least one of Ag, Al, Au, Pt, Ru, Ir, or the like. The support member 330 may be formed to have a slope of a specified angle (θ) with respect to the light emitter 320. For example, at least a portion of the support member 330 may be formed to have a slope of 45° with respect to the light emitter 320, thus totally reflecting the light, output from the light emitter 320, toward the pattern layer 350.

According to an embodiment, the support member 330 may include, at least in part, a reflection layer 331 where total reflection occurs. For example, the reflection layer 331 may be a dielectric reflection layer formed of at least one high-reflective material such as, for example, and without limitation, an omnidirectional reflective (ODR), a distributed Bragg reflector (DBR), or the like. The high-reflective material may include, for example, and without limitation, at least one of TiN, AlN, $TiO_2$, $Al_2O_3$, $SnO_2$, $WO_3$, $ZrO_2$, or the like. According to an embodiment, the support member 330 may include the reflection layer 331 formed of a metallic material, such as, for example, and without limitation, Ag, Al, Au, Pt, Ru, Ir, or the like.

According to various embodiments, the light whose pattern is changed through the pattern layer 350 passes through the transparent member 340 and is incident on the first meta-surface 360. The first meta-surface 360 may change an angle of the incident light that passed through the pattern layer 350 and passing through the transparent member 340.

Figure 4:
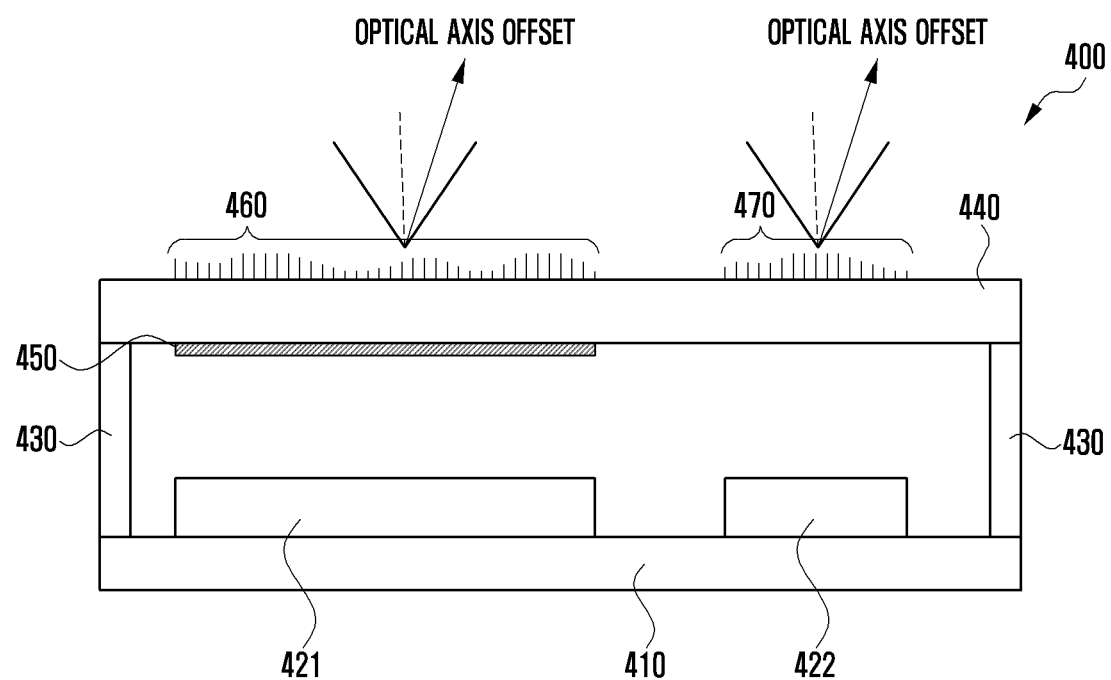
FIG. 4 is a diagram illustrating an example light source module according to another embodiment.

FIG. 4 is a diagram illustrating an example light source module 400 according to another embodiment.

According to various embodiments, the light source module 400 may include a substrate 410 (e.g., the substrate 110 of FIG. 1), a first light emitter (e.g., including a first light source) 421 (e.g., the light emitter 120 of FIG. 1), a second light emitter (e.g., including a second light source) 422, a support member 430 (e.g., the support member 130 of FIG. 1), and a transparent member (e.g., including a transparent material) 440 (e.g., the transparent member 140 of FIG. 1). In some embodiments, the light source module 400 may omit at least one of the above components or further include any other component.

According to various embodiments, the substrate 410 may be electrically connected to the first light emitter 421 and/or the second light emitter 422 and thereby transmit a control signal. The substrate 410 may be, for example, and without limitation, a printed circuit board (PCB), a flexible printed circuit board (FPCB), a rigid flexible printed circuit board (RFPCB), or the like. According to an embodiment, the substrate 410 (e.g., a first substrate) may be laminated with another substrate (e.g., a second substrate) to form a multilayer circuit substrate. For example, the second substrate may be stacked under and electrically connected to the first substrate and thereby transmit a control signal to the light source module 400 mounted on the first substrate.

According to various embodiments, the first light emitter 421 may include a light source, such as, for example, and without limitation, an array of light emitting elements capable of emitting light and be disposed in a first region on one surface of the substrate 410. For example, the first light emitter 421 may output light of a first infrared wavelength band by selecting at least one of the light emitting elements. According to an embodiment, the first light emitter 421 may output light having a wavelength band of about 800 to 850 nm. According to an embodiment, the light emitting element may include a laser light source. The laser light source may be, for example, and without limitation, an edge emitting laser, a vertical-cavity surface emitting laser (VCSEL), a distributed feedback laser, or the like. In an example embodiment, the first light emitter 421 may output light of a visible ray band.

According to various embodiments, the second light emitter 422 may be disposed in a second region on one surface of the substrate 410. The second light emitter 422 may output light of a second infrared wavelength band. According to an embodiment, the second light emitter 422 may output light having a wavelength band of about 900 to 950 nm.

According to various embodiments, the first light emitter 421 and/or the second light emitter 422 may include a band pass filter to filter light of a nearby infrared wavelength band. In an example embodiment, the first light emitter 421 and/or the second light emitter 422 may emit light in a pulse or continuous waves by being synchronized with an input frame of an infrared image sensor.

According to various embodiments, the support member 430 may be disposed on one surface of the substrate 410 where the first and second light emitters 421 and 422 are mounted. The support member 430 supports the transparent member 440 so that the transparent member 440 is spaced apart from the first and second light emitters 421 and 422 by a predetermined distance. The support member 430 may accommodate at least a portion of the first and second light emitters 421 and 422. According to an embodiment, at least a portion of the support member 430 may operate as a tilted mirror that reflects the light, output from the first light emitter 421, toward the transparent member 440. For example, at least a portion of the support member 430 may be formed to have a slope of a specified angle with respect to the first light emitter 421.

According to various embodiments, the transparent member 440 may include various transparent materials and be disposed over the support member 430. According to an embodiment, the transparent member 440 may form, at least in part, one surface of the light source module 400. For example, the transparent member 440 may be formed as a housing that protects electronic components (e.g., the first and second light emitters 421 and 422) inside the light source module 400 by dispersing or absorbing a pressure applied from the inside or outside. According to an embodiment, the transparent member 440 may be formed of a transparent material such as, for example, and without limitation, glass, polymer, or the like, that allows the light output from the light emitter(s) to pass through the transparent member 440 to the outside.

According to various embodiments, the pattern layer 450 (e.g., the pattern layer 150 of FIG. 1) may be formed on or attached to a first surface of the transparent member 440 and change the pattern of light output from the light emitting elements. According to an embodiment, when the pattern layer 450 is formed on the first surface of the transparent member 440, a first meta-surface 460 may be formed on a second surface of the transparent member opposite to the first surface.

According to various embodiments, the first meta-surface 460 (e.g., the first meta-surface 160 of FIG. 1) may include a plurality of first unit structures capable of changing the angle of the light whose pattern is changed through the pattern layer 450.

According to various embodiments, the first meta-surface 460 may be formed over at least a part of the first region. For example, the first meta-surface 460 may be disposed to face the first light emitter 421 to receive the light from the first light emitter 421 and then refract the received light in a designated direction. According to an embodiment, the first light emitter 421 may include, for example, and without limitation, an edge emitting laser, a distributed feedback laser, or the like, and in this example the first meta-surface 460 may be formed over at least a part of the first region or over a third region which is different from the first and second regions. The first unit structures included in the first meta-surface 460 may be formed to have dimensional elements (e.g., height and diameter) smaller than the first infrared wavelength band. The first unit structures may be disposed at intervals smaller than the first infrared wavelength band.

According to various embodiments, the second meta-surface 470 may be formed over at least a portion of the second region. For example, the second meta-surface 470 may be disposed to face the second light emitter 422 to receive the light from the second light emitter 422 and then refract the received light in a designated direction. The second unit structures included in the second meta-surface 470 may be formed to have dimensional elements (e.g., height and diameter) smaller than the second infrared wavelength band. The second unit structures may be disposed at intervals smaller than the second infrared wavelength band. According to an embodiment, the second meta-surface 470 may be formed on the same surface of the transparent member 450 as the surface where the first meta-surface 460 is formed. The second meta-surface 470 may be disposed in the second region which is different from the first region where the first meta-surface 460 is disposed. In this example, although the first and second regions of the transparent member 450 have the same thickness, the unit structures included in the respective regions may have different arrangements (e.g., diameters, heights, and intervals) to refract light of different wavelength bands.

According to various embodiments, at least a portion of the pattern layer 450 may be formed as a third meta-surface including third unit structures. The third unit structures included in the third meta-surface 450 may be formed to have dimensional elements (e.g., height and diameter) smaller than the first infrared wavelength band. Also, the third unit structures may be disposed at intervals smaller than the first infrared wavelength band.

Figure 5:
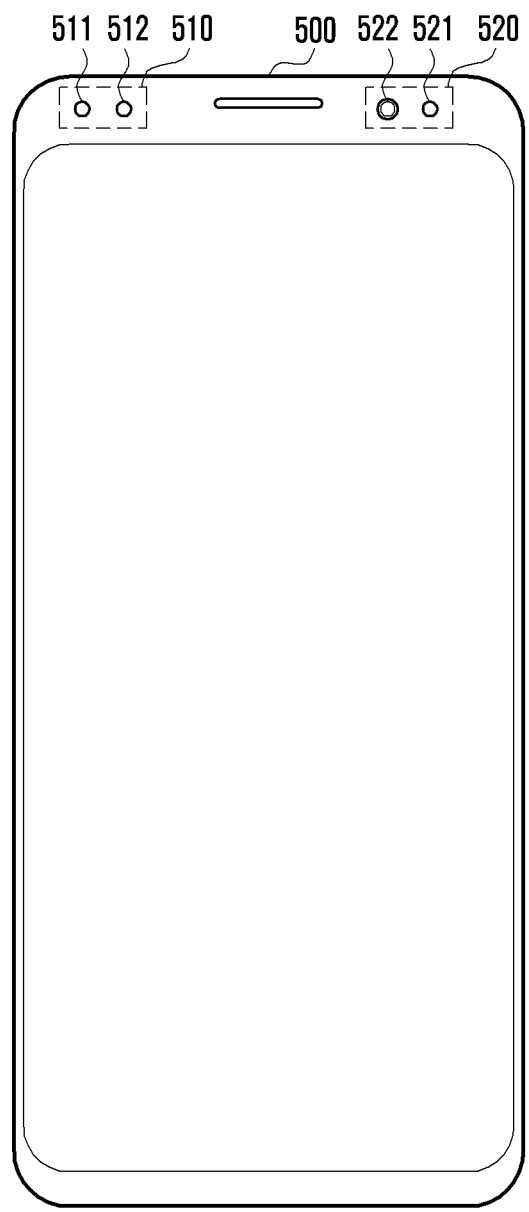
FIG. 5 is a diagram illustrating an example electronic device including a light source module according to various embodiments.

FIG. 5 is a diagram illustrating an example electronic device 500 including a light source module 510 according to various embodiments.

According to various embodiments, the electronic device 500 may include various electronic components (e.g., a camera module 520, the light source module 510, a processor, and the like) and a housing for protecting such components. The housing may form an appearance of the electronic device 500 by including, for example, a front surface, a rear surface opposite to the front surface, and lateral surfaces surrounding a space formed between the front and rear surfaces.

According to various embodiments, the electronic device 500 may expose the camera module 520 and/or the light source module 510 through at least a portion of the front or rear surface. Although FIG. 5 shows an embodiment of exposing the camera module 520 and the light source module 510 through the front surface of the electronic device 500, various embodiments of the disclosure are not limited thereto. For example, either the camera module 520 or the light source module 510 may be exposed through a lateral surface of the electronic device 500.

According to various embodiments, the light source module 510 may include at least one of a first light emitter 511 for outputting light of a first infrared wavelength band or a second light emitter 512 for outputting light of a second infrared wavelength band. In an example embodiment, the light source module 510 may include only one light emitter (e.g., the first light emitter 511), or may further include another light emitter.

According to various embodiments, the light source module 510 may include a transparent member (e.g., the transparent member 140 of FIG. 1 or 440 of FIG. 4). According to an embodiment, the transparent member may have a first meta-surface (e.g., the first meta-surface 160 of FIG. 1 or 460 of FIG. 4) corresponding to the first light emitter 511 (e.g., the light emitter 120 of FIG. 1 or the first light emitter 421 of FIG. 4) and/or a second meta-surface (e.g., the second meta-surface 470 of FIG. 4) corresponding to the second light emitter 512 (e.g., the second light emitter 422 of FIG. 4). For example, the first meta-surface may receive light from the first light emitter 511 and then refract the light in a designated direction (e.g., a direction toward a first camera 522), and the second meta-surface may receive light from the second light emitter 512 and then refract the light in a designated direction (e.g., a direction toward a second camera 521).

According to an embodiment, the transparent member may include a pattern layer (e.g., the pattern layer 150 of FIG. 1 or 450 of FIG. 4) that outputs incident light in a specified pattern. The pattern layer may be disposed on a surface opposite to the first meta-surface.

According to various embodiments, the camera module 520 may include the first camera 522 for acquiring an image using a first infrared wavelength band, and the second camera 521 for acquiring an image using a second infrared wavelength band. According to an example embodiment, using one camera, the camera module 520 may acquire an image of the first infrared wavelength band and an image of the second infrared wavelength band. According to various embodiments, the first camera 522 and/or the second camera 521 may include, for example, and without limitation, at least one of a complementary metal oxide semiconductor (CMOS) image sensor, a charge-couple device (CCD) image sensor, or the like. According to an embodiment, the first camera 522 may capture light output from the first light emitter 511 and reflected from an object, and the second camera 521 may capture light output from the second light emitter 512 and reflected from the object.

According to an embodiment, the electronic device 500 may obtain three-dimensional information (e.g., shape information) using image information acquired from the first camera 522. For example, the electronic device 500 may emit light of a designated pattern to an object through the first light emitter 511 and acquire an image of the object through the first camera 522. The electronic device 500 may identify a positional change and/or distortion of the designated pattern caused by the object, based on the acquired image, thereby estimating a three-dimensional shape of the object. According to an embodiment, the electronic device 500 may perform biometric authentication of the user using the image information acquired from the first camera 522.

According to an embodiment, the electronic device 500 may perform biometric authentication of the user using the information acquired from the second camera 521. For example, the electronic device 500 may emit light of an infrared band to the user through the second light emitter 512 and then acquire an image of the user through the second camera 521. The electronic device 500 may identify user's biometric information (e.g., iris information), based on the acquired image, thereby performing the biometric authentication of the user.

FIG. 6 is a block diagram illustrating an electronic device 601 in a network environment 600 according to various embodiments. Referring to FIG. 6, the electronic device 601 in the network environment 600 may communicate with an electronic device 602 via a first network 698 (e.g., a short-range wireless communication network), or an electronic device 604 or a server 608 via a second network 699 (e.g., a long-range wireless communication network). According to an embodiment, the electronic device 601 may communicate with the electronic device 604 via the server 608. According to an embodiment, the electronic device 601 may include a processor 620, memory 630, an input device 650, a sound output device 655, a display device 660, an audio module 670, a sensor module 676, an interface 677, a haptic module 679, a camera module 680, a power management module 688, a battery 689, a communication module 690, a subscriber identification module (SIM) 696, or an antenna module 697. In some embodiments, at least one (e.g., the display device 660 or the camera module 680) of the components may be omitted from the electronic device 601, or one or more other components may be added in the electronic device 601. In some embodiments, some of the components may be implemented as single integrated circuitry. For example, the sensor module 676 (e.g., a fingerprint sensor, an iris sensor, or an illuminance sensor) may be implemented as embedded in the display device 660 (e.g., a display).

The processor 620 may execute, for example, software (e.g., a program 640) to control at least one other component (e.g., a hardware or software component) of the electronic device 601 coupled with the processor 620 and may perform various data processing or computation. According to one embodiment, as at least part of the data processing or computation, the processor 620 may load a command or data received from another component (e.g., the sensor module 676 or the communication module 690) in volatile memory 632, process the command or the data stored in the volatile memory 632, and store resulting data in non-volatile memory 634. According to an embodiment, the processor 620 may include a main processor 621 (e.g., a central processing unit (CPU) or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or to be specific to a specified function. The auxiliary processor 623 may be implemented as separate from, or as part of the main processor 621.

The auxiliary processor 623 may control at least some of functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). According to an embodiment, the auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input device 650 may receive a command or data to be used by another component (e.g., the processor 620) of the electronic device 601, from the outside (e.g., a user) of the electronic device 601. The input device 650 may include, for example, a microphone, a mouse, a keyboard, or a digital pen (e.g., a stylus pen).

The sound output device 655 may output sound signals to the outside of the electronic device 601. The sound output device 655 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. According to an embodiment, the display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. According to an embodiment, the audio module 670 may obtain the sound via the input device 650, or output the sound via the sound output device 655 or a headphone of an external electronic device (e.g., an electronic device 602) directly (e.g., wiredly) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. According to an embodiment, the sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device (e.g., the electronic device 602) directly (e.g., wiredly) or wirelessly. According to an embodiment, the interface 677 may include, for example, a high definition multimedia interface (HDMI), a universal serial bus (USB) interface, a secure digital (SD) card interface, or an audio interface.

A connecting terminal 678 may include a connector via which the electronic device 601 may be physically connected with the external electronic device (e.g., the electronic device 602). According to an embodiment, the connecting terminal 678 may include, for example, a HDMI connector, a USB connector, a SD card connector, or an audio connector (e.g., a headphone connector).

The haptic module 679 may convert an electrical signal into a mechanical stimulus (e.g., a vibration or a movement) or electrical stimulus which may be recognized by a user via his tactile sensation or kinesthetic sensation. According to an embodiment, the haptic module 679 may include, for example, a motor, a piezoelectric element, or an electric stimulator.

The camera module 680 may capture a still image or moving images. According to an embodiment, the camera module 680 may include one or more lenses, image sensors, image signal processors, or flashes.

The power management module 688 may manage power supplied to the electronic device 601. According to one embodiment, the power management module 688 may be implemented as at least part of, for example, a power management integrated circuit (PMIC).

The battery 689 may supply power to at least one component of the electronic device 601. According to an embodiment, the battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the application processor (AP)) and supports a direct (e.g., wired) communication or a wireless communication. According to an embodiment, the communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth™, wireless-fidelity (Wi-Fi) direct, or infrared data association (IrDA)) or the second network 699 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. According to an embodiment, the antenna module 697 may include an antenna including a radiating element composed of a conductive material or a conductive pattern formed in or on a substrate (e.g., PCB). According to an embodiment, the antenna module 697 may include a plurality of antennas. In such a case, at least one antenna appropriate for a communication scheme used in the communication network, such as the first network 698 or the second network 699, may be selected, for example, by the communication module 690 (e.g., the wireless communication module 692) from the plurality of antennas. The signal or the power may then be transmitted or received between the communication module 690 and the external electronic device via the selected at least one antenna. According to an embodiment, another component (e.g., a radio frequency integrated circuit (RFIC)) other than the radiating element may be additionally formed as part of the antenna module 697.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 601 and the external electronic device 604 via the server 608 coupled with the second network 699. Each of the electronic devices 602 and 604 may be a device of a same type as, or a different type, from the electronic device 601. According to an embodiment, all or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

The electronic device 601 according to various example embodiments may include a light source module that includes a substrate, a first light emitter comprising a light source disposed in a first region on one surface of the substrate and including an array of first light emitting elements capable of emitting light of a first infrared wavelength band, a second light emitter comprising a light source disposed in a second region on the one surface of the substrate and including an array of second light emitting elements capable of emitting light of a second infrared wavelength band, and a transparent member comprising transparent material. The transparent member may include a pattern layer formed on or attached to a first surface of the transparent member and configured to change a pattern of the light output from the first light emitting elements, and a first meta-surface disposed on a second surface of the transparent member and including a plurality of first unit structures configured to change an angle of the light that passed through the pattern layer. The electronic device 601 may include a camera module that includes a first camera configured to acquire an image using a first infrared wavelength band and a second camera configured to acquire an image using a second infrared wavelength band. The electronic device 601 may include the processor 620, which is configured to control the electronic device to emit light of a designated pattern to an object through the first light emitter, to acquire an image of the object through the first camera, to identify a positional change and/or distortion of the designated pattern caused by the object based on the acquired image, and to estimate a three-dimensional shape of the object.

According to various example embodiments, the first unit structures of the electronic device 601 may have at least one dimensional element smaller in length than the first infrared wavelength band.

According to various example embodiments, the pattern layer of the electronic device 601 may be formed of a metal sheet having a hole at least in part.

According to various example embodiments, the processor 620 of the electronic device 601 may be configured to control the electronic device to emit light of an infrared band to an object through the second light emitter, to acquire biometric information of the object through the second camera, and to perform biometric authentication based on the acquired biometric information.

According to various example embodiments, the transparent member of the electronic device 601 may further include a second meta-surface facing the second light emitter and including second unit structures configured to change an angle of the light output from the second light emitting elements.

According to various example embodiments, the second unit structures of the electronic device 601 may have at least one dimensional element smaller in length than the second infrared wavelength band.

The electronic device according to various example embodiments may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, and/or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, firmware, or any combinations thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 640) including one or more instructions that are stored in a storage medium (e.g., internal memory 636 or external memory 638) that is readable by a machine (e.g., the electronic device 601). For example, a processor (e.g., the processor 620) of the machine (e.g., the electronic device 601) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply denotes that the storage medium is a tangible device, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure is described with reference to various example embodiments thereof, it will be understood that the various example embodiments are intended to be illustrative, not limiting. One skilled in the art will understand that various changes in form and detail may be made without departing from the true spirit and full scope of the disclosure as set forth, for example, in the appended claims and equivalents thereof.

What is claimed is:

1. A light source module comprising:
   a substrate;
   a light emitter comprising a light source disposed on one surface of the substrate and including an array of light emitting elements configured to emit light;
   a support disposed on the one surface of the substrate and accommodating at least a portion of the light emitter; and
   a transparent member comprising transparent material disposed over the support,
   wherein the transparent member includes:
      a pattern layer disposed on a first surface of the transparent member facing surfaces of the array of light emitting elements configured to emit the light, the pattern layer configured to change a pattern of the light output from the light emitting elements, and
      a first meta-surface disposed on a second surface of the transparent member opposite the first surface and including a plurality of first unit structures, each comprising a refractor, configured to change an angle of the light that passed through the pattern layer.

2. The light source module of claim 1, wherein the first unit structures are disposed at intervals smaller than wavelength of the light.

3. The light source module of claim 1, wherein the pattern layer comprises a metal sheet having a hole.

4. The light source module of claim 1, wherein the pattern layer comprises a second meta-surface having second unit structures.

5. The light source module of claim 1, wherein the light emitter and the pattern layer are spaced apart from each other by a predetermined distance, the light output from the light emitting elements is configured to provide a planar light source having substantially uniform brightness and intensity on the pattern layer, and a thickness of the transparent member is greater than the predetermined distance.

6. The light source module of claim 5, wherein the predetermined distance is in a range of 0.2 to 0.3 mm.

7. The light source module of claim 1, wherein the transparent member comprises at least one of glass or polymer.

8. The light source module of claim 1, wherein the transparent member has a thickness in a range of 0.9 to 1.5 mm.

9. A light source module comprising:
   a substrate;
   a light emitter comprising a light source disposed on one surface of the substrate and including an array of light emitting elements configured to emit light;
   a support disposed on the one surface of the substrate and accommodating at least a portion of the light emitter, wherein the light emitter is configured to output the light toward at least a portion of the support; and
   a transparent member disposed over the support,
   wherein the transparent member includes:
      a pattern layer disposed on a first surface of the transparent member facing the light emitter and configured to provide an image-side focal point and change a pattern of the light output from the light emitting elements; and
      a first meta-surface disposed on a second surface of the transparent member opposite to the first surface and including a plurality of first unit structures, each comprising a refractor, configured to change an angle of the light that passed through the pattern layer, wherein the transparent member includes a thickness corresponding to an image-side focal length, and the thickness of the transparent member and characteristics of the first meta-surface defines an object-side focal length.

10. The light source module of claim 9, wherein the light emitter includes at least one of an edge emitting layer or a distributed feedback laser.

11. The light source module of claim 9, wherein the at least a portion of the support has a slope of a specified angle with respect to the light emitter to reflect the light output from the light emitter toward the transparent member.

12. The light source module of claim 9, wherein the support includes a reflection layer configured to provide total reflection.

13. The light source module of claim 9, wherein the pattern layer comprises a metal sheet including a hole.

14. The light source module of claim 9, wherein the pattern layer comprises a second meta-surface having second unit structures.

15. A light source module comprising:
   a substrate;
   a first light emitter comprising a first light source disposed in a first region on one surface of the substrate and including an array of first light emitting elements configured to emit light of a first infrared wavelength band;
   a second light emitter comprising a second light source disposed in a second region on the one surface of the substrate and including an array of second light emitting elements configured to emit light of a second infrared wavelength band;
   a support disposed on the one surface of the substrate and accommodating at least a portion of the first and second light emitters; and
   a transparent member comprising transparent material disposed over the support,
   wherein the transparent member includes:
      a pattern layer disposed on a first surface of the transparent member facing surfaces of the first and second arrays of light emitting elements configured to emit the light, the pattern layer configured to change a pattern of the light output from the first light emitting elements, and
      a first meta-surface disposed on a second surface of the transparent member opposite to the first surface and including a plurality of first unit structures, each comprising a refractor, configured to change an angle of the light that passed through the pattern layer.

16. The light source module of claim 15, wherein the pattern layer and the first meta-surface are disposed over at least a part of the first region.

17. The light source module of claim 15, wherein the pattern layer comprising a metal sheet having a hole.

18. The light source module of claim 15, wherein the pattern layer comprises a second meta-surface having second unit structures.

19. The light source module of claim 15, wherein the transparent member further includes a third meta-surface disposed on the second surface of the transparent member and including a plurality of third unit structures configured to change an angle of the light output from the second light emitting elements.

20. The light source module of claim 15, wherein the first unit structures have at least one dimensional element smaller in length than the first infrared wavelength band.

* * * * *